United States Patent Office 3,479,858
Patented Nov. 25, 1969

3,479,858
APPARATUS FOR MEASURING VISCOELASTICITY
Masashi Umeno, Kawasaki-shi, Makoto Miyake, Nishinomiya-shi, and Chikao Tosaki, Tokyo, Japan, assignors to Japan Synthetic Rubber Co., Ltd., Tokyo, Japan
Filed Feb. 27, 1967, Ser. No. 618,771
Claims priority, application Japan, Mar. 8, 1966, 41/13,885
Int. Cl. G01n 3/22, 33/44
U.S. Cl. 73—15.6                           3 Claims

ABSTRACT OF THE DISCLOSURE

Viscoelastic measuring apparatus including a rotatable lower platen with a cavity and an upper platen with a protrude, the latter being rotatable but fixed in relation to the former. Upon angular oscillation of the lower platen, viscoelasticity of the specimen inserted in a hollow space between the protrude and the cavity will be measured by means of a load cell rigidly protruded from the upper platen.

---

This invention relates to an improved apparatus for measuring the viscoelasticity of rubber or plastic materials by means of the torsional modulus, and particularly to such an apparatus which is conveniently used in determining the degree of vulcanization of rubber by observing the changes in the viscoelasticity that attend the progress of vulcanization in the process of vulcanization of rubber.

The properties of vulcanized rubber which has been vulcanized by compounding such compounding agents as carbon black, sulfur, accelerators, antioxidants, etc., with the rubber material is influenced by the extent to which vulcanization is carried, if the compounding recipe and processing procedures are unchanged. Hence, the determination of the state of vulcanization of vulcanized rubber is very important from the standpoint of quality control.

The method of determining the state of vulcanization which has been widely employed to date consists of a method which utilizes the fact that there occurs a change in the cross-linking density and such properties as tensile strength, modulus, permanent set, hardness and extent of swelling of vulcanized rubber depending upon its degree of vulcanization. Thus, it is necessary in this case to obtain specimens by vulcanizing a compounded rubber of a given compounding recipe with serially arranged vulcanizing times and to perform tests on each of the so obtained specimens. Hence, there arises the necessity of preparing a great number of specimens and of performing numerous tests. Consequently, much time and labor are required for obtaining the conclusions.

Various kinds of apparatus have been developed to date for measuring viscoelasticity. Among those which determine viscoelasticity by dynamic shearing modulus are the Vulkameter (Ed. by Peter et al., Rubber Chemistry and Technology, vol. 31, 105–116, 1958), Curometer (Ed. by More et al., Rubber Journal and International Plastics, June 6, 858–862, 1959) and CEPAR (Ed. by Claxtone et al., Rubber World, 71–78, May 1961). On the other hand, among the kinds of apparatus in which the determination is made by means of torsional modulus, there is the Plastometer of Mooney, U.S. Patent 2,037,529 as well as the Rheometer (Ed. by Decker et al., Rubber Chemistry and Technology, vol. 36, 451–458, 1963) and Viscurometer (Ed. by Juve et al., Rubber World, 43–49, December 1963).

All of the three latter kinds of apparatus are those in which the viscosity of the specimen is measured by either rotating or angularly displacing a rotor or disk in the specimen. Each of these three latter kinds of apparatus has an upper platen and a lower platen which are each provided with a die. A flat cylindrical or biconical rotor or disk is rotated or angularly oscillated in a cavity formed by the dies of the two platens when the upper platen is laid over the lower platen, and the viscoelasticity of the specimen is measured by taking out the rotational torque of the rotor. In carrying out the measurement using these kinds of apparatus, two specimens are needed for the both sides of the rotor or disk. Moreover, since one side of the rotor has a shaft for supporting and rotating the rotor, the specimen to be placed on this side having the shaft must have a hole for passage of the shaft, though the specimen to be placed at the side of the rotor not having the shaft does not have a hole.

Further, when measurement is made by these kinds of apparatus, the tested specimens cover the flat both surfaces of the rotor, with the consequence that the specimens which have been removed from the cavity along with the rotor stick to the surfaces of the rotor. Thus, for reusing the rotor the specimens must be removed from the rotor. Moreover, when the rotor is removed from the cavity immediately after the measurement is made, the specimens that adhere to both surfaces of the rotor are still hot from the heat that was applied when they were in the cavity and hence cannot be handled with bare hands. Thus, in removing the specimens from both surfaces of the rotor, the operator must perform a difficult task while using gloves for protecting the hands from heat.

In contradistinction, according to the present invention, the viscoelasticity of the specimen is measured using an apparatus comprising an upper platen or member having a downwardly protuberant part and a lower platen or member having a cavity for receiving said protuberant part, both platens or members being heated during operation. When the foregoing upper platen is superposed over the lower platen, a petri dish like hollow space defined by the protuberant part and the cavity is formed. After placing a single specimen in this hollow space, the lower platen is oscillated relatively of the upper platen for a distance equal to a minor angular displacement, thereby accomplishing the viscoelasticity measurement. Hence, only a single specimen needs to be placed in the cavity and its fabrication is also simple. Further, if the upper platen is elevated upwardly after the measurement the specimen remains in the cavity of the lower platen. The specimen can then be removed from the cavity or recess by using a pin with which it can be speared for removing. Hence, the installation and removal of the specimen is very simple as compared with the case of the conventional apparatus.

It is therefore an object of this invention to provide an apparatus which can determine the viscoelasticity of the specimens or the degree of vulcanization of rubber by means of a simple operation and moreover in a short period of time.

The gist of this invention resides in an apparatus for measuring viscoelasticity which comprises upper and lower frames, a plurality of guide rods which stand upright in the lower frame and support the upper frame, an upper pushing plate movable vertically along at least one pair of said guide rods, a bearing-equipped bearing plate integral with said upper pushing plate, an upper platen fixed to a shaft journaled in said bearing, said shaft being rotatable in said bearing, said upper platen being capable of vertical movements integrally with said bearing plate, a lower platen pivotally mounted on said lower frame, means for urging said upper platen against said lower platen, means for effecting the reciprocative angular displacement of the lower platen relative to the upper platen and means for heating the upper and lower platens individually, characterized in that said upper platen has a protuberant part facing said lower platen, while said lower platen has a cavity for receiving said protuberant part thereby forming, when the protuberant part fits in close proximity to the cavity, a hollow space between the inner surface of said cavity and the outer surface of said protuberant part, wherein the specimen to be measured is inserted, and means are provided for taking out via said upper platen the stress that the specimen is subjected to when the lower platen is angularly oscillated.

An embodiment of the invention will be described with reference to the accompanying drawings. This invention however should not be limited thereby, however only insofar as the same may be limited by the appended claims. In the drawings:

Figure 1:
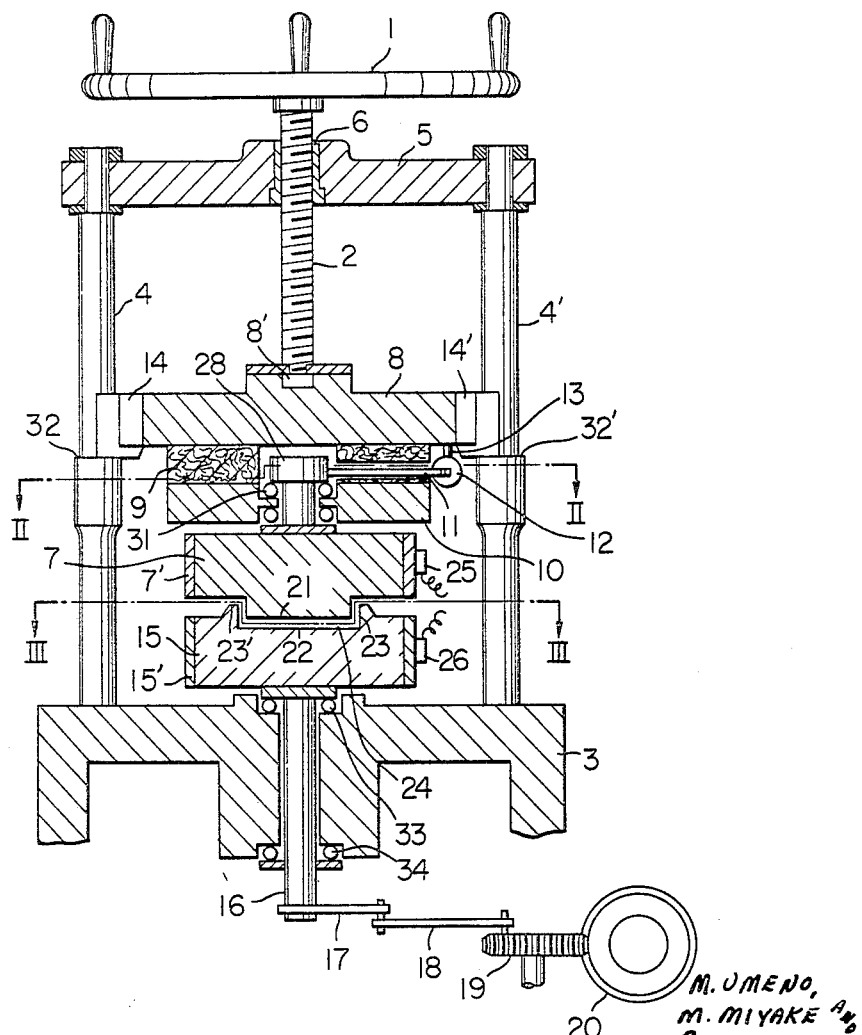
FIG. 1 is a vertical section illustrating the essential parts of the apparatus of the present invention.
Figure 2:
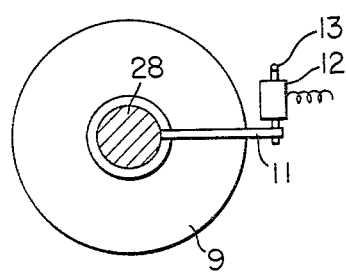
FIG. 2 is a sectional view taken along line II—II of FIG. 1 and illustrates the manner in which the upper platen and a load cell are connected.

Referring to FIG. 1 which illustrates the essential parts of the apparatus, a supporting frame 5 is mounted on a pair of guide rods 4 and 4', which are secured to a base frame 3. Frame 5 is provided with a female screw threaded sleeve 6 in its middle part, and a threaded rod 2 fitted with a handle 1 is in threaded engagement therewith. At the lower end of the rod 2 an upper pushing plate 8 is rotatably attached by means of a bearing 8' embedded in the latter. To the bottom of plate 8 a bearing plate 10 is fastened with an insulating plate 9 interposed therebetween. Below the bearing plate 10 is disposed a cylindrical upper plate or member 7. Member 7, which is wrapped with a band heater 7', has a shaft 28 which extends upwardly from the central part of member 7 into the bearing plate 10 and be journaled in a bearing means 31 disposed in the plate 10 thereby rendering the member 7 rotatable relative to the bearing plate 10. A lever 11 attached to a point in the neighborhood of the distal end of the shaft 28 extends therefrom outwardly through the insulating plate 9 and is secured to a load cell or strain measurement device 12 which is attached to a piece 13 projecting below the pushing plate 8 (see FIG. 2). Thus, upper member 7 is restricted as to its rotation relative to the plate 8. At the two opposing sides of the plate 8 are provided guides 14 and 14' which engage with the guide rods 4 and 4'. Hence, when the handle 1 is turned, the plate 8 fitted with the rod 2 can be raised or lowered between the shoulders 32 and 32' of guide rods 4 and 4' and the upper frame 5, with the insulating plate 9, bearing plate 10 and member 7 moving integrally therewith.

A cylindrical lower platen or member 15 of a diameter about the same as that of the upper member 7 is disposed atop a frame 3 directly below the upper member 7 and concentrically therewith. Member 15, which is wrapped with a band heater 15', has a shaft 16 on its underside which extends downwardly through the frame 3 while being supported by bearing means 33 and 34 thereby rendering the member 15 rotatable on the frame 3. The remote end of the shaft 16 is fitted with a crank arm 17 to the other end of which an arm 18 is pivoted. The other end of the arm 18 is pivoted to a worm wheel 19 which meshes with a worm 20. Consequently, when worm 20 is rotated, arm 17 oscillates to reciprocatingly move the member 15 for a given angular displacement.

Figure 3:
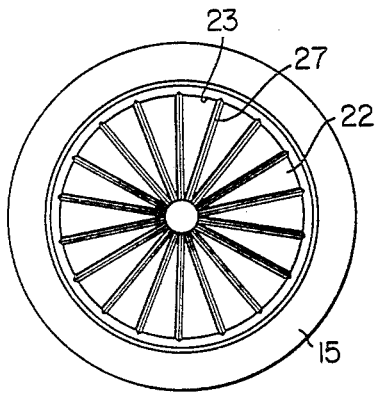
FIG. 3, is a plan view taken along line III—III of FIG. 1, and illustrates the lower platen.
Figure 4:
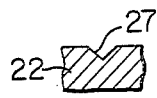
FIG. 4 is an enlarged sectional view of the cavity of the lower platen, the surface of which cavity has grooves provided therein.

The upper member 7 has at the middle part of its underside, i.e., the part facing the lower member 15, a cylindrical protuberant part 21, while the middle part of the upper side of the lower member, i.e., that part facing the upper member, is provided with a cavity or recess 22 in a location opposite to that of the protuberant part 21. The inner diameter of the recess 22 is slightly greater than the outer diameter of the protuberant part 21, and hence when the plate 8 descends as far as the shoulders 32 and 32' and members 7 and 15 have come closest to each other, a petri dish like hollow space 24 is formed by means of the side wall 23 and recess 22 of the lower member and the cylindrical protuberant part 21 of the upper member. As hereinafter described, this hollow space must be completely occupied by a specimen. Thus, it is necessary to pack the hollow space with the rubber specimen in an amount somewhat in excess of the volume occupied by this space and eliminate the excess part of the specimen that remains after completely filling the hollow space. In addition, since, as hereinbefore noted, the lower member 15 must be angularly displaced by the reciprocating angular movement of the shaft 16 as a result of the rotation of the worm 20, a very small clearance of preferably 0.3–1 mm. is provided between the upper member 7 and a projecting rim 23' of the side wall 23. For preventing the slippage of the rubber specimen when packed in the hollow space, the surface of the recess 22 is provided, as shown in FIGS. 3 and 4, with radially arranged V-shaped grooves 27. Likewise, the inner sides of the side wall 23 of the recess as well as the underside of and side wall of the protuberant part 21 are also provided with the V-shaped grooves (not shown). Instead of the aforesaid grooves, the several sufaces bounding the space 24 may also be provided with other suitable frictional surfaces such as will prevent the slippage of the specimen.

Members 7 and 15 are fitted with band heater terminals 25 and 26, respectively, and the respective band heaters 7' and 15' are heated by means of an electric source (not shown). Thus the respective members are electrically heated with their temperature being controlled to maintain a given temperature. The load cell 12 is so adapted that the stress applied thereto can be taken out electrically by a conventional means (not shown).

As an illustration of the measurement of the viscoelasticity of plastic materials, using the apparatus, the determination of the degree of vulcanization of rubber will be described.

Figure 5:
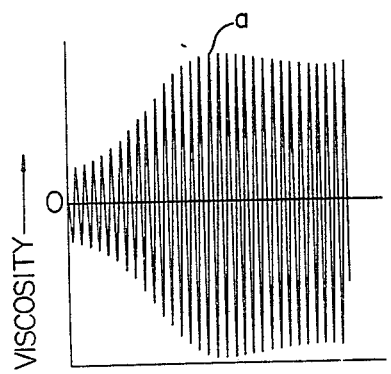
FIG. 5 is a viscosity-time curve which has been recorded using the apparatus of the invention.

When vulcanizable compounded rubber is placed in the recess 22 and the members 7 and 15 are brought together, the rubber fills the hollow space 24 completely. When after heating the band heaters 7' and 15' to the prescribed temperature, the worm 20 is rotated by means of a driving device (not shown), the lower member 15 is rotated reciprocatingly through a given angle (usually not more than 15 degrees) via a transmission system. The external surface of the rubber is in intimate contact with the contacting surfaces of the upper member 7 and the lower member 15 and is prevented from slipping over the contacting surfaces by means of the grooves. Hence, when the lower member is angularly displaced relative to the upper member, a stress corresponding to the viscosity of the rubber is transmitted to the upper member. The stress transmitted to the upper member is transmitted to the load cell 12 by means of the lever 11. This stress is recorded on the recording device (not shown) from the load cell and a viscosity-time curve as shown in FIG. 5 is obtained. In FIG. 5 the ordinate represents the viscosity of the rubber while the abscissa represents time. Thus a change in the viscosity with respect to time is shown. This shows that the viscosity increases as the vulcanization progresses with the passage of time. When a viscosity indicated as $a$ is reached after the elapse of a certain time, this is an indication that the vulcanization has attained an optimum state.

After completion of the measurment as to the vulcanization, the member 7 is pulled up from the member 15 and the rubber specimen remains behind in the recess 22. Although this rubber specimen is of such hotness that it cannot be directly touched with the bare hands, it can readily be removed with a pin. Hence, the next measurement cycle can be repeated in succession after insertion in the recess 22 of the next specimen to be measured. The lower member 15 of the apparatus being exchangeable, it is possible to vary the thickness of the hollow space 24. Consequently, the determination of the degree of vulcanization can be carried out with a specimen thickness close to that actually used in practice.

Since a rotor rotating in the specimen is not used in determining the viscoelasticity of the specimen using the apparatus, the clearance of the space 24 between the upper platen and lower platen can be reduced. As a result, the specimen is heated from above and below with the same temperature and hence becomes heated rapidly and uniformly to its prescribed temperature. Thus, the determination of the degree of vulcanization of rubber can be carried out in a short period of time with a simple operation.

In the case of the prior art apparatus wherein a rotor rotates or oscillates in the specimen, such as Mooney's plastometer, rheometer and viscurometer, a rotor was in all cases disposed in the cavity, and hence there was a limit as to the extent to which the clearance of the cavity could be reduced. When the heating of a specimen is carried out from the upper and lower platens with a rotor disposed in the cavity, a part of the heat which has been transmitted to the specimen is transmitted to the rotor, with the consequence that the heat distribution in the specimen is nonuniform at first and a certain time is required for this heat distribution to become uniform. Thus, for ensuring that the uniform heating of the rubber specimen is accomplished as quick as possible, it is necessary to preheat the rotor to the neighborhood of the prescribed temperature. In this case however, since the rotor is hot, the hand operation of fitting the holed specimen to the side of the rotor having the shaft is attended with difficulty because the rotor cannot be handled with bare hands.

Although the foregoing embodiment is concerned with the instance of determining the viscoelasticity of rubber during its vulcanization process, the measurement of the viscoelasticity of unvulcanized rubber or other plastic materials can also be likewise accomplished.

What is claimed is:

1. An apparatus for measuring viscoelasticity which comprises upper and lower frames, a plurality of guide rods which stand upright in the lower frame and support the upper frame, an upper pushing plate movable vertically along at least one pair of said guide rods, a bearing-equipped bearing plate integral with said upper pushing plate, a shaft journaled in said bearing, an upper platen fixed to said shaft, said upper platen being capable of vertical movements integrally with said bearing plate, a lower platen pivotally mounted on said lower frame, means urging said upper platen against said lower platen, means coupled to said lower platen for effecting reciprocative angular displacement of the lower platen relative to the upper platen, means associated with the upper and lower platens for heating them individually, said upper platen having a protuberant part facing said lower platen, said lower platen having a cavity for receiving said protuberant part for forming, when the protuberant part is in close proximity to the cavity a hollow space between the inner surface of said cavity and the outer surface of said protuberant part, wherein the specimen to be measured is inserted, and means associated with said upper platen for sensing the stress to which the specimen is subjected when the lower platen is angularly oscillated.

2. An apparatus according to claim 1 wherein the outer and inner surfaces of said protuberant part and cavity, respectively, which are in vis-à-vis relation, have a frictional surface to prevent the slippage of the specimen.

3. An apparatus according to claim 1 wherein said means for taking out the stress to which the specimen is subjected comprises a lever projecting radially from said shaft of the upper platen, and a load cell rigidly fitted to the distal end of said lever, said load cell being fixed relative to said upper pushing plate.

References Cited

UNITED STATES PATENTS

| 2,752,778 | 7/1956 | Roberts et al. | 73—60 |
| 3,033,021 | 5/1962 | Dickason | 73—15.6 |
| 3,182,494 | 5/1965 | Beatty et al. | 73—15.6 X |

JERRY W. MYRACLE, Primary Examiner

U.S. Cl. X.R.

73—99